UNITED STATES PATENT OFFICE.

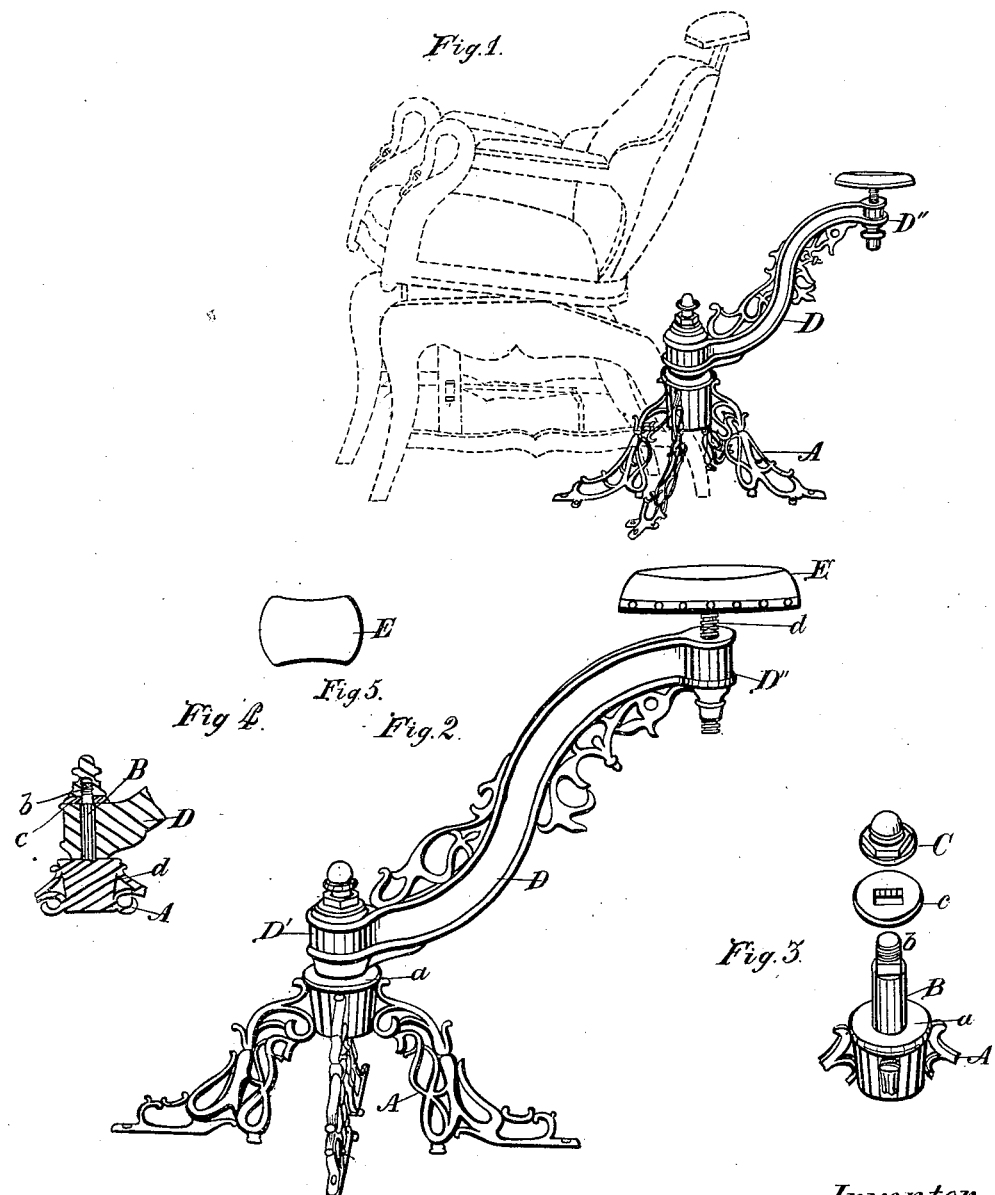

FRANK KAMMERER, OF RACINE, WISCONSIN.

STOOL FOR BARBERS' USE.

SPECIFICATION forming part of Letters Patent No. 246,317, dated August 30, 1881.

Application filed June 24, 1881. (No model.)

*To all whom it may concern:*

Be it known that I, FRANK KAMMERER, of Racine, in the county of Racine, and in the State of Wisconsin, have invented certain new and useful Improvments in Swing-Stools for Barbers' Use; and I do hereby declare that the following is a full, clear, and exact description thereof.

The object of my invention is to provide a seat for dentists and barbers while at work; and the nature of my invention will be hereinafter fully set forth.

In the drawings, Figure 1 is a perspective view of my device in position behind a barber's chair, which is shown in dotted lines. Fig. 2 is a perspective of my device exaggerated. Fig. 3 is a detail, as is also Fig. 4; and Fig. 5 is a top view of the seat of my device.

A is a stand which is to be secured to the floor by screws passing through holes in its feet, and which has a central hub, $a$.

B is a spindle which is projected up through the hub. This spindle B terminates in a threaded portion, $b$, to receive a nut, C, and is squared just below its threaded portion to receive the washer $c$.

D is the seat-bracket, the hub $D'$ of which is designed to fit upon spindle B, the washer $c$ being interposed between the nut C and the hub $D'$, to prevent frictional contact between the hub $D'$ and the nut, for if the nut were screwed directly down upon the hub $D'$ each turn of the bracket would have a tendency to either tighten or loosen the nut. The hub $D''$ of the bracket D is screw-threaded to receive the screw-threaded spindle $d$ of the seat E.

I prefer to make the seat E of oblong shape, that the operator may sit astride it with his feet lightly resting on the floor.

An operator using my device may, without taking his hands from the patient, turn himself into any position necessary, and stand or sit while astride the seat without hindering his work.

I claim as my invention—

The operator's stool for barbers and dentists, consisting of the stand A, having spindle B, the washer $c$, and nut C, the laterally-extending swiveled bracket D, having perforated hubs $D'$ $D''$, the hub $D'$ being perforated to receive the spindle B, and the seat E, provided with screw $d$, adjustable in the hub $D''$, all substantially as described, and for the purpose set forth.

In testimony that I claim the foregoing I have hereunto set my hand this 7th day of June, 1881.

FRANK KAMMERER.

Witnesses:
S. S. STOUT,
HAROLD G. UNDERWOOD.